United States Patent [19]

Wolcott

[11] Patent Number: 4,660,098

[45] Date of Patent: Apr. 21, 1987

[54] APPARATUS FOR PRODUCING COPIES OF A VIDEO IMAGE UTILIZING LINE PATTERN ROTATION

[75] Inventor: Dana W. Wolcott, Honeoye Falls, N.Y.

[73] Assignee: Eastman Kodak Company, Rochester, N.Y.

[21] Appl. No.: 788,378

[22] Filed: Oct. 17, 1985

[51] Int. Cl.[4] .............................................. H04N 5/84
[52] U.S. Cl. .................................... 358/332; 358/244; 358/75; 358/283
[58] Field of Search .................... 358/75, 58, 140, 244, 358/227, 332, 345, 347, 302, 283; 346/108, 110 R

[56] References Cited

U.S. PATENT DOCUMENTS

| | | | |
|---|---|---|---|
| 3,542,951 | 11/1970 | Wolff | 358/217 |
| 4,096,530 | 6/1978 | Plugge et al. | 358/244 |
| 4,197,559 | 4/1980 | Cramling | 358/58 |
| 4,225,929 | 9/1980 | Ikeda | 364/521 |
| 4,259,669 | 3/1981 | Tanigaki | 343/5 EM |
| 4,267,555 | 5/1981 | Boyd et al. | 340/727 |
| 4,342,046 | 7/1982 | Kamata | 358/75 |
| 4,360,805 | 11/1982 | Andrews et al. | 340/744 |
| 4,373,156 | 2/1983 | Pfannkunch et al. | 358/332 |
| 4,437,121 | 3/1984 | Taylor et al. | 358/160 |
| 4,438,453 | 3/1984 | Alston | 358/75 |
| 4,467,369 | 8/1984 | Alston | 358/75 |
| 4,471,349 | 9/1984 | Strolle | 340/728 |

Primary Examiner—John W. Shepperd
Attorney, Agent, or Firm—Robert F. Cody

[57] ABSTRACT

An apparatus is disclosed for producing "hard" color copies of a video image utilizing line pattern rotation to reduce the visual perception of "raster" lines and improved image quality. Line pattern rotation is accomplished by rotating the raster line pattern of a CRT relative to the displayed image between each exposure of the color components of the composite video image.

6 Claims, 4 Drawing Figures

APPARATUS FOR PRODUCING COPIES OF A VIDEO IMAGE UTILIZING LINE PATTERN ROTATION

BACKGROUND OF THE INVENTION

1. Field of the Invention

This invention relates to apparatus for producing a "hard" copy of a static video image displayed on a cathode ray tube (CRT), and more particularly to such apparatus which employ photography for image copying purposes.

2. Description Relative to the Prior Art

A well known approach to obtaining a "hard" color copy of a video image is to photograph the image while it is displayed on a color cathode ray tube (CRT). This approach requires a static image that can be achieved, for example, by electronically selecting a video signal representative of a single frame of a television picture and repeatedly applying the signal to the CRT. The static image could alternatively be produced from a videotape recorder or video disk system operating in a still-frame mode.

The color copy from this approach, however, is of poor image quality when compared with a direct photograph of the scene being televised or videotaped. It is known that the image quality can be improved by separating the color components of the video signal associated with a scene, viz. the red, green and blue video signals, and sequentially displaying the component video signals on a monochromatic CRT. The screen of the CRT is photographed through color filters, the colors of the filters being synchronized to the corresponding color video signal components being displayed on the CRT, thereby to expose the photographic film to the red, green and blue color components of the video image.

While the color separation method does provide improved image quality in comparison with photographing a color CRT, the image quality suffers from the appearance of "raster" lines in the photograph due to the scanning pattern of the CRT electron beam. The photographed image appears, therefore, to be composed of a number of parallel image lines instead of a continuous image.

One method known in the prior art to obscure the raster lines is to display the video image a multiple of times, offsetting the image vertically each time the image is displayed (see for example U.S. Pat. No. 4,360,805). This method requires a large number of exposures of the static image (typically sixteen) in order to obscure the raster lines sufficiently. In the color separation system previously described, this method would require an excessive number of exposures (sixteen for each color component) in order to produce a photograph of the video image.

Other art which may be of interest in relation to the present invention may be found in U.S. Pat. No. 4,437,121 and U.S. Pat. No. 4,225,929.

SUMMARY OF THE INVENTION

The present invention provides an apparatus for producing "hard" color copies of a video image that utilizes "line pattern rotation" to reduce the visual perception of "raster" lines and improve image quality. As in the aforementioned color separation method, the present invention displays the three color component signals of the video image separately, but departs from the prior art by providing means for rotating the raster line pattern of the CRT relative to the displayed image between each exposure of the photographic film to the color component image signals.

In a preferred embodiment of the invention, line pattern rotation is accomplished by rotating the face of the CRT clockwise (CW) or counterclockwise (CCW) after the display of each color component video signal. Further, electronic image processing means are provided for electronic reverse rotation of the color component images displayed so that all three images (the red, green and blue) always coincide on the same vertical and horizontal axes. In other words, the rotation of the displayed image caused by the physical rotation of the CRT is negated by electronically rotating the displayed image back to its original position.

Means for exposing a photosensitive film are provided to expose the film to each of the color component signal images. The physical rotation of the CRT, however, will now cause the raster lines from each of the displayed color component signals to intersect one another in a cross-hatched pattern on the photosensitive film thereby reducing the visual perception of the raster lines and significantly improving overall image quality.

With the above as background, reference should now be made to the following figures for a detailed description of the invention:

FIGS. 1A-1C are diagrams of a CRT screen illustrating physical rotation of the CRT and electronic rotation of the displayed image, FIG. 2 is a diagram showing the effects of line pattern rotation in a photograph, FIG. 3 is a schematic block diagram of apparatus according to the invention, and FIG. 4 is a process flow diagram of the operation of the apparatus in FIG. 3.

DETAILED DESCRIPTION

Figure 1:
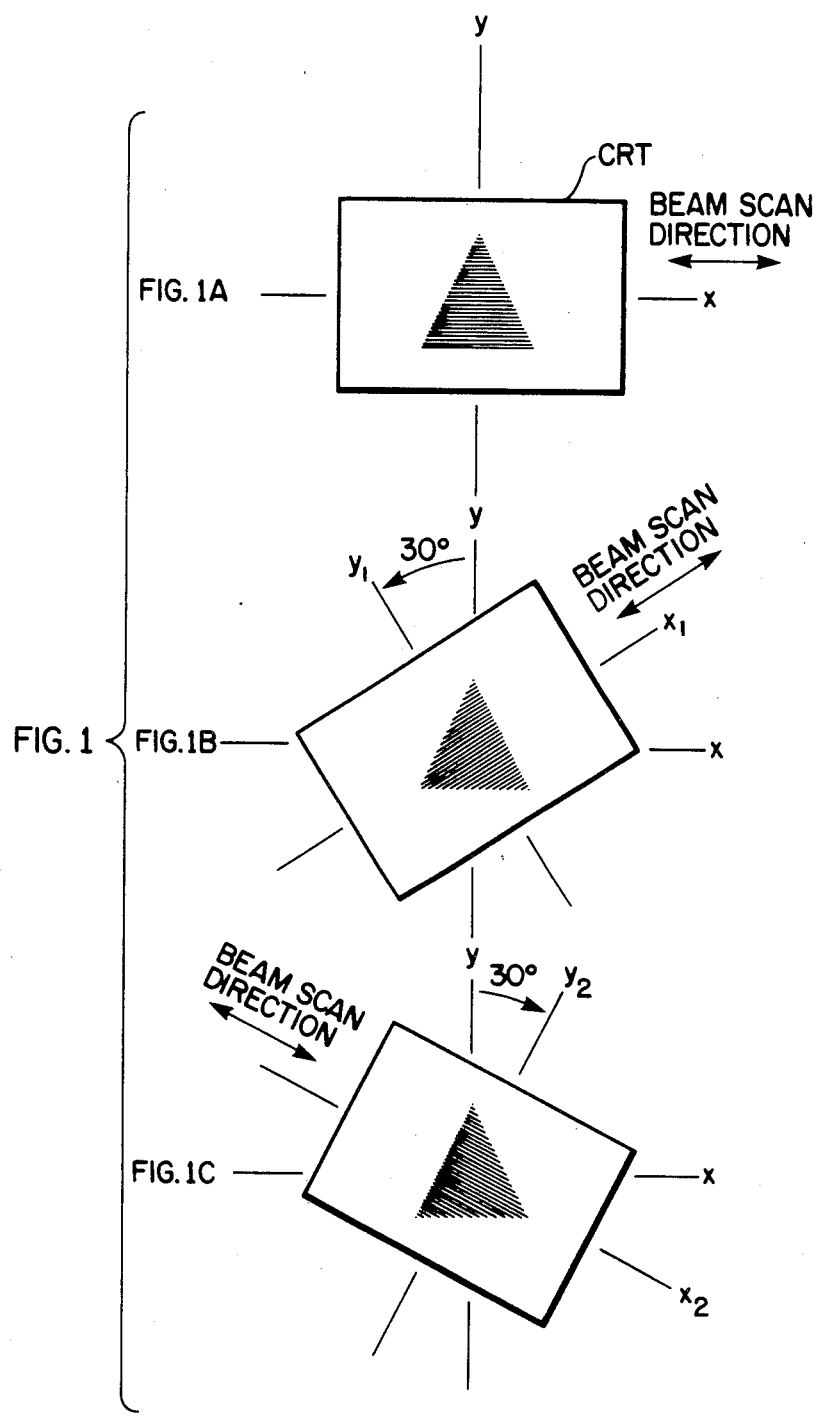

Referring now to FIGS. 1A-1C, diagrams representing the screen of a CRT are shown for purposes of illustrating the invention. As shown in FIG. 1A, the CRT has an imaging area on which is displayed an image representative of a color component video signal of the composite video image, for example the green component video signal. The face of the CRT is photographed by a camera mechanism (not shown) to record the green component video signal image.

The CRT is physically rotated CCW 30° with respect to its X-Y axes as shown in FIG. 1B. The second color component video signal, say the red component, is electronically "rotated" such that when the red image is displayed, it will be centered on the X-Y axes instead of the $X_1$-$Y_1$ axis. The electron scanning beam, however, will scan in a direction parallel to the $X_1$ axis. Therefore, the raster line pattern will appear at an angle in the red image component, instead of horizontal as in the green image component.

The film that recorded the green image is exposed by the camera mechanism to the displayed red component video signal image. The red component image will therefore be superimposed over the green component image on the film. The process is repeated with the remaining color component, the blue component, by rotating the CRT to a position 30° CW with respect to the X-Y axes and exposing the film to the blue image component (See FIG. 1C).

Figure 2:
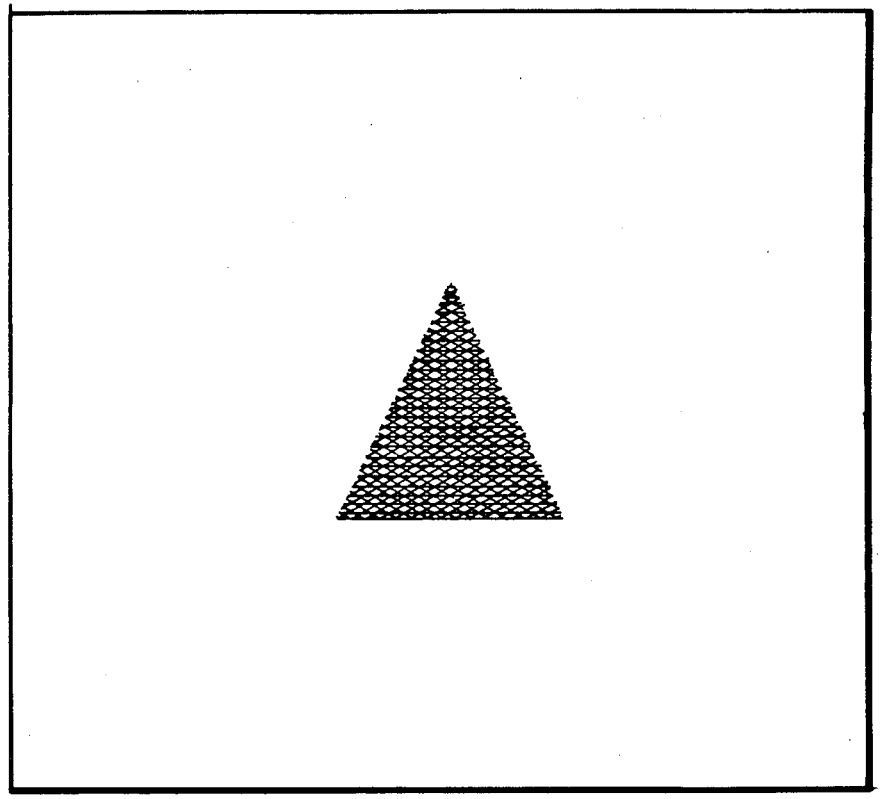

The effect of the line pattern rotation is shown in FIG. 2. Instead of the image appearing to be composed of a number of parallel image lines, the cross-hatched pattern reduces the visual perception of the raster lines and the image appears to be continuous.

Figure 3:
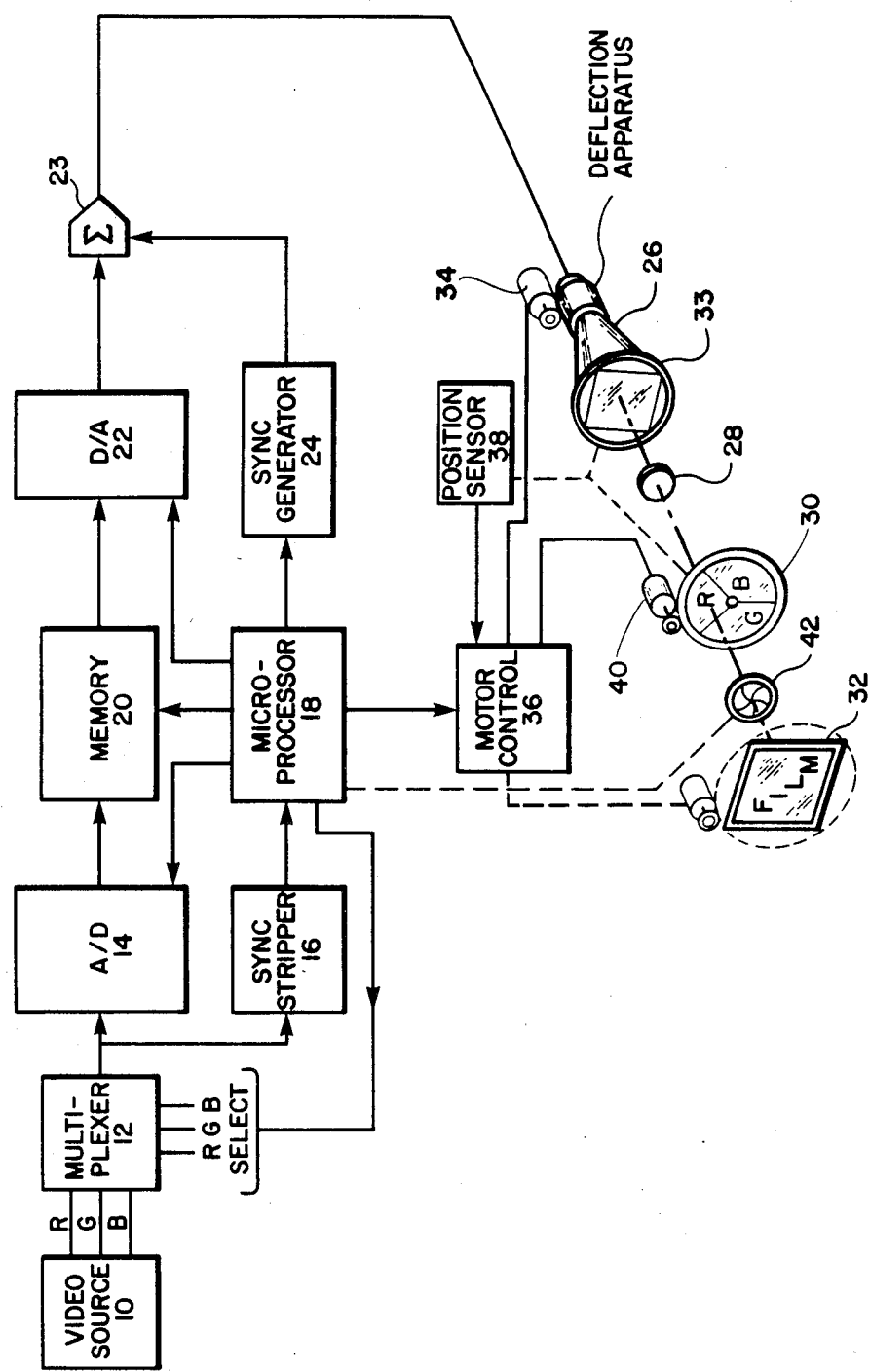

A diagram of an apparatus embodying the present invention is shown in FIG. 3. A video source 10 represents a source of red, green, and blue color component video signals such as the output from a conventional color decoding circuit in a television receiver or the output from a videotape recorder. A multiplexer 12 receives the three component signals from the video source 10 and selectively applies an output signal based on which select line has been activated by a microprocessor 18. The selected output from the multiplexer 12 is supplied to an analog-to-digital (A/D) converter 14 and to a sync stripper 16. The synchronization information from the sync stripper 16 is used by the microprocessor 18 to synchronize the clocking cycles of the A/C converter 14 and a memory 20.

The microprocessor 18 selects each of the component video signals and stores digital representations of the component signals in the memory 20. The component signals are composed of a number of horizontal video lines. The digital sampling of the component video signals determines the magnitude of the video signal at a number of discrete image spots or "pixels" in respective horizontal video lines. The digital representation of the magnitude of the video signal for each pixel is stored in an X-Y array in the memory 20. The video source 10 supplies a static image signal during the memory store cycle.

In order to produce a "hard" copy, the three color component image signals are retrieved from the memory 20 sequentially. The digital information representing the first component signal (the green component) is read out from the memory 20, converted back to an analog signal by a D/A converter 22, and combined by a circuit 23 with the appropriate synchronization signal from a sync generator 24. The output of the output 23 is supplied to the CRT 26 for the time period necessary to effect proper exposure of the photographic film 32. The image from the CRT 26 is focused by a lens 28; and film 32 is exposed to the image through the appropriate filter on a filter wheel 30, when a shutter 42 is opened.

The CRT 26, which is mounted in a rotatable ring 32, is rotated by a motor 34 to a position 30° CCW from the Y axis after the exposure of the film 32 to the first color component image is completed. The motor 34 is controlled by the motor control circuit 36; and a position sensor 38 provides feedback to the control circuit 36 indicating when the CRT 26 is in the correct position. Likewise the filter wheel 30 is rotated to the next position by a motor 40 which is also controlled by the control circuit 36.

The microprocessor 18 uses an algorithm to electronically rotate the second color component signal to be displayed on the CRT 26 (Red Component) so that the displayed image will be centered on the X-Y axes as shown in FIG. 1B. Simple trigonometric functions can be used to calculate the $X_1$-$Y_1$ address of each pixel stored in the memory 20

$$X_1 = y\sin\Theta + X\cos\Theta$$

$$Y_1 = y\cos\Theta - X\sin\Theta$$

where $\Theta$ is the angle of rotation (CW) from the original axes.

Figure 4:
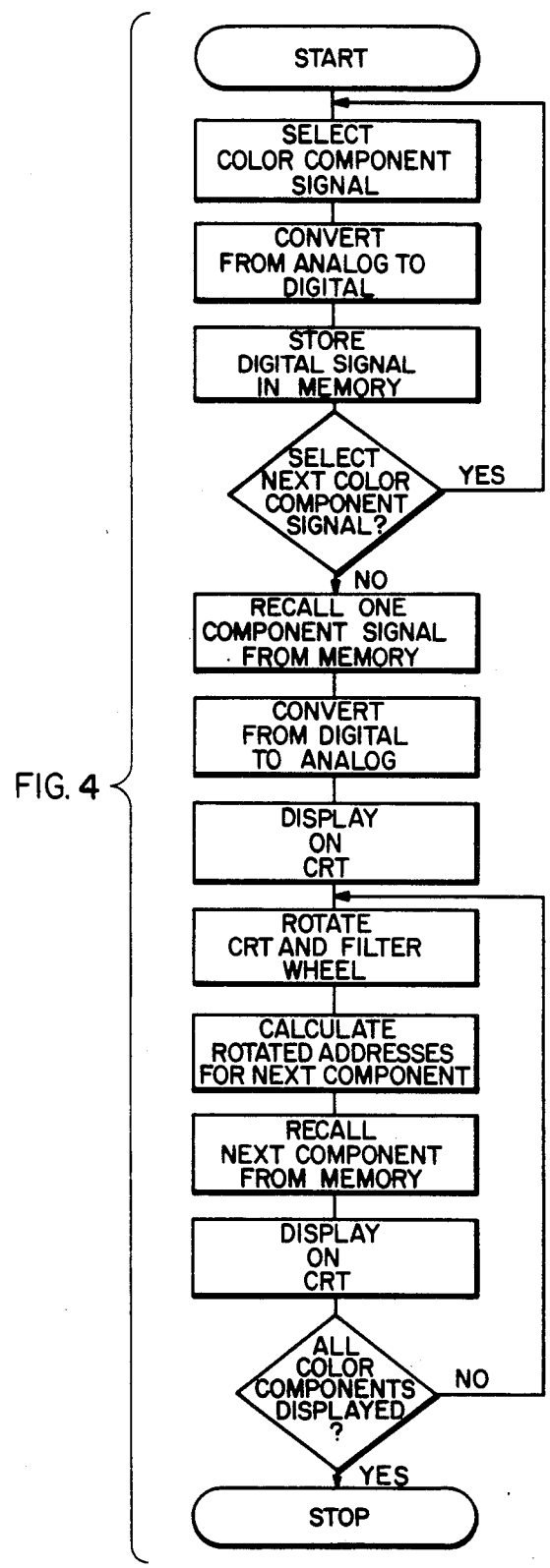

The film 32 is then exposed to the second color component. The CRT 26 is rotated to a position 30° CCW from the y axis and the process is repeated for the remaining color component. A flow diagram of the above-described process is provided in FIG. 4.

The composite image recorded of the film contains the cross-hatched line pattern shown in FIG. 2. The cross-hatched pattern generated from line pattern rotation significantly reduces the perception of the raster lines in the photograph and improves overall image quality.

The invention has been described in detail with particular reference to certain preferred embodiments thereof, but it will be understood that variations and modifications can be effected within the spirit and scope of the invention. For example line pattern rotation could be accomplished by physically rotating the film 32 instead of the CRT 26, or by physically rotating the yoke structure of CRT 26 instead of the entire CRT. Electronic rotation would still be employed to superimpose the color component images on the film. Line pattern rotation could also be used to improve image quality in monochromatic systems.

What is claimed is:

1. Apparatus for producing a copy of a video image displayed on a CRT having a raster line pattern produced by a deflection apparatus, said apparatus comprising:
    (a) circuit means for periodically displaying said video image on said CRT,
    (b) means for selectively rotating said raster line pattern relative to said video image between each display of said video image, and
    (c) means for repeatedly exposing a photosensitive material to said video image displayed on said CRT,
   wherein said means for rotating comprises:
    (i) means for physically rotating the deflection apparatus of said CRT, and
    (ii) electronic processing means for electronically rotating said video image displayed on said CRT.

2. Apparatus for producing a color copy of a video image, said video image having separate color component images, said apparatus comprising:
    (a) a CRT having a raster line pattern,
    (b) means for selectively displaying said color component images on said CRT,
    (c) means for rotating the raster line pattern of said CRT relative to said displayed color component images, and
    (d) means for exposing a photosensitive film to each of said displayed color component images.

3. The apparatus in claim 2 wherein said means for rotating comprises:
    (a) motor means for physically rotating said CRT, and
    (b) electronic processing means for electronically rotating said color component images as displayed on said CRT.

4. Apparatus for reducing a perception of a raster line pattern in a color copy of a video image displayed on a CRT, said video image having color component video images, said apparatus comprising:
    (a) means for selectively displaying the color component video images of said video signal on said CRT, (b) camera means for exposing a photosensitive material to each of said color component video images displayed on said CRT,
(c) positioning means for maintaining the position of said color component video images to a fixed axis relative to said camera means, and
(d) rotating means for rotating said raster line pattern so that the raster line pattern of each color component video image is at a different angle relative to said fixed axis to thereby reduce the perception of raster lines in said copy.

5. Apparatus for reducing a perception of a raster line pattern in a color copy of a video image displayed on a CRT, said video image having color component video images, said apparatus comprising:
(a) means for selectively displaying the color component video images of said video signal on said CRT,
(b) camera means for exposing a photosensitive material to each of said color component video images displayed on said CRT,
(c) positioning means for maintaining the position of said color component video images to a fixed axis relative to said camera means, and
(d) rotating means for rotating said raster line pattern relative to said color component video images to thereby reduce the perception of raster lines in said copy,
wherein said positioning means comprises electronic processing means to electronically rotate each of the color component images displayed on said CRT.

6. The apparatus in claim 5 wherein said rotating means comprises means for physically rotating said CRT.

* * * * *